SELECTION MECHANISM FOR MULTIMESSAGE TAPE PHONOGRAPH

Filed June 20, 1968 4 Sheets-Sheet 1

INVENTOR
NORMAN E. SINDLINGER
BY
Amster & Rothstein
ATTORNEYS

INVENTOR
NORMAN E. SINDLINGER
BY
Amcke & Rothstein
ATTORNEYS

INVENTOR
NORMAN E. SINDLINGER
BY
Amster & Rothstein
ATTORNEYS

INVENTOR
NORMAN E. SINDLINGER
BY
Amster & Rothstein
ATTORNEYS

United States Patent Office 3,525,527
Patented Aug. 25, 1970

3,525,527
SELECTION MECHANISM FOR MULTIMESSAGE TAPE PHONOGRAPH

Norman E. Sindlinger, Medford Lake, N.J., assignor to Ideal Toy Corporation, Hollis, N.Y., a corporation of New York Filed June 20, 1968, Ser. No. 738,622
Int. Cl. G11b *3/00, 25/06*
U.S. Cl. 274—11 28 Claims

ABSTRACT OF THE DISCLOSURE

A selection mechanism for a multimessage tape phonograph. As the string is pulled during wind-up, the stylus is moved across the width of the tape to control the random selection of a groove on the tape. Depending on the direction in which the string is pulled out of the unit, the range of stylus movement is restricted to an associated section of the tape. Thus, for example, the selection may be limited to either "happy" or "sad" messages.

This invention relates generally to multimessage tape phonograph devices for use in dolls, toys and the like, and more particularly to a mechanism which allows a message to be selected on a partially-programmed, partially-random basis.

There are many different kinds of audio devices which have been suggested for use in toy dolls. In some of these a disc record is used, while in others a linear tape is used. A very desirable feature in talking dolls and toys is the randomness of message selection. In the case of a disc record audio device, a number of messages may be recorded in interleaved spiral grooves, each starting at a distinct point along the outer edge of the record and all spiralling in toward the center. The stylus picks one of the grooves at random depending on the first groove starting point it engages at the beginning of each play. In the case of a tape audio device, a number of parallel grooves may be provided on the tape. Before the play begins, the stylus may be moved transversely across the width of the tape, randomly stopping on top of one of the many grooves. As the tape moves past the stylus the message recorded in the selected groove is heard.

In my copending application Ser. No. 620,501, filed Mar. 3, 1967, there is disclosed a tape audio device wherein any one of the grooves on the tape may be selected at random. But, as described in that application, in certain situations it may be desirable to provide a mechanism which allows the child to choose a particular one of a plurality of groups of message sequences, from which chosen group one of the included sequences will be randomly selected. For example, the tape may include a number of "happy" messages and a number of "sad" messages; after the child first selects one of the groups, one of the messages in the selected group will be determined randomly.

In the device disclosed in my copending application, there are provided three strings, each attached to a pull-ring. One of these is used for winding up the spring which drives the tape during the play of the device. Each of the other two strings, when pulled, limits the message selection to one half of the tape. If neither of the two message-selection strings is pulled, the message which is played is selected randomly from all of those on the tape. But if one of the message-selection strings is pulled, the message which is selected is determined randomly from only those messages included on the respective half of the tape. A disadvantage of this design is that when the selection is partially-programmed, that is, when the message selection is limited to a particular half of the tape, the child must pull two strings—one for limiting the selection to a particular group, and the other for winding up the drive spring and selecting at random a message in the particular group.

It is a general object of this invention to provide a partially-programmed, partially-random selection mechanism for a tape audio device of the type described in which only a single pull string is provided for both winding up the drive spring and for limiting the random selection of a message from those in a pre-selected group of messages.

More specifically, in the illustrative embodiment of the present invention, if the pull string is pulled straight out from the doll, a message on either side of the center line of the tape may be selected at random. If the string is pulled to one side of the doll as it is withdrawn from it, the random selection of a message is limited to the messages included on one half of the tape. If the string is pulled to the other side of the doll as it is withdrawn from it, the random selection of a message is limited to those included on the other half of the tape. For example, if the string is pulled straight out from the back of the doll the selected message may be "happy" or "sad." If the string is pulled out from the back of the doll, not straight out but veering toward the left side of the doll, the random selection of messages is limited to the "happy" sequences. If, on the other hand, the string is pulled out veering toward the right side of the doll, the random selection is limited to the "sad" sequences.

Briefly, in the illustrative embodiment of my invention, tape supply and take-up drums are provided together with spring output and storage drums. The spring has a natural tendency to coil around its output drum. In the rest condition the spring is so coiled, and the multigroove tape is wound around its take-up drum. When the string is pulled during wind-up, the spring output drum is turned and the spring is transferred to it. At the same time, the tape supply drum is turned and the tape is transferred to it from the tape take-up drum. When the string is released, the spring returns to its storage drum and in so doing causes the string to be withdrawn back into the doll and the tape to be transferred from its supply drum to its take-up drum. A stylus and tone arm assembly are provided for coupling the tape to a speaker assembly, and depending on the transverse position of the stylus with respect to the tape one of the tape messages is played.

The tone arm is mounted on a shaft which is transverse to the tape. The tone arm is slidably mounted so that as it moves on its shaft the stylus moves transversely across the tape. On the shaft there is also provided a rotatable cam which engages the tone arm assembly. When the string is withdrawn from the doll, the rotatable cam is turned and, since it is at all times in contact with the tone arm assembly it causes the latter to move back and forth along the shaft transverse to the tape. This movement controls a random selection of one of the messages. When the string is released, a ratchet assembly prevents further rotation of the cam so that the tone arm remains in the selected position for the duration of the play.

In the prior art pull string-operated talking dolls, a hole has generally been provided in the doll body for extending the pull string therethrough. Because the size of the hole generally conforms to the diameter of the string, the direction in which the string is withdrawn from the doll is of no importance. In the illustrative embodiment of my invention, however, a slit is provided in the doll body parallel with the direction of the shaft on which the tone arm assembly and the rotatable cam are carried. The string is wrapped around the rotatable cam and extended through the slit in the doll body to a pull ring. If the string is pulled straight out from the doll body, that is, with the string emerging from the center of the slit, the principal force imparted to the rotating cam is one which turns it around its supporting shaft. The cam surface is such that the tone arm assembly is moved across the central region of the tape as the cam rotates.

However, if the string is pulled out of the slit toward one side of doll, in addition to a torque being applied to the rotating cam there is also provided an axial force in the direction of the supporting shaft toward one side of the doll body. This force causes the rotating cam to be displaced slightly from its central position on the supporting shaft. Although when the cam rotates the tone arm assembly still slides back and forth across the shaft, the path of movement is shifted toward one side of the tape. Consequently, only the messages included in that half of the tape are involved in the random selection.

If the tape is pulled out toward the other side of the doll, the rotating cam is displaced in the opposite direction on the supporting shaft. Consequently, while the tone arm assembly still slides back and forth on its supporting shaft to the same extent, the range of movement is shifted to the other half of the tape and only a message in this half of the tape can be selected.

The total range of movement of the tone arm assembly back and forth on its supporting shaft is approximately one-half the width of the tape. If the rotating cam is placed in one extreme position on its supporting shaft, the range of movement of the tone arm assembly is adjacent one-half of the tape. With the rotating cam displaced at its opposite extreme, the range of movement is limited to the other half of the tape. With the rotating cam in its neutral position, the range of movement of the tone arm assembly is centered at the center of the tape. Since the range of movement theoretically is at all times approximately half the width of the tape, it is apparent that the random selection is limited to the inner half of each of the two halves of the tape, that is, the selection is limited to one-half of the "happy" messages and one-half of the "sad" messages. In practice, however, as will be described below, when the string is pulled straight out any one of the messages on more than half the tape may be selected.

It is a feature of my invention to provide for transverse movement of a tone arm assembly with respect to the message tape within a predetermined range of movement during the wind-up operation, the manner in which the pull string is withdrawn from the doll controlling the relative placing of the path of movement of the tone arm assembly relative to the message tape.

Further objects, features and advantages of my invention will become apparent upon a consideration of the following detailed description in conjunction with the drawing, in which.

Figure 11:
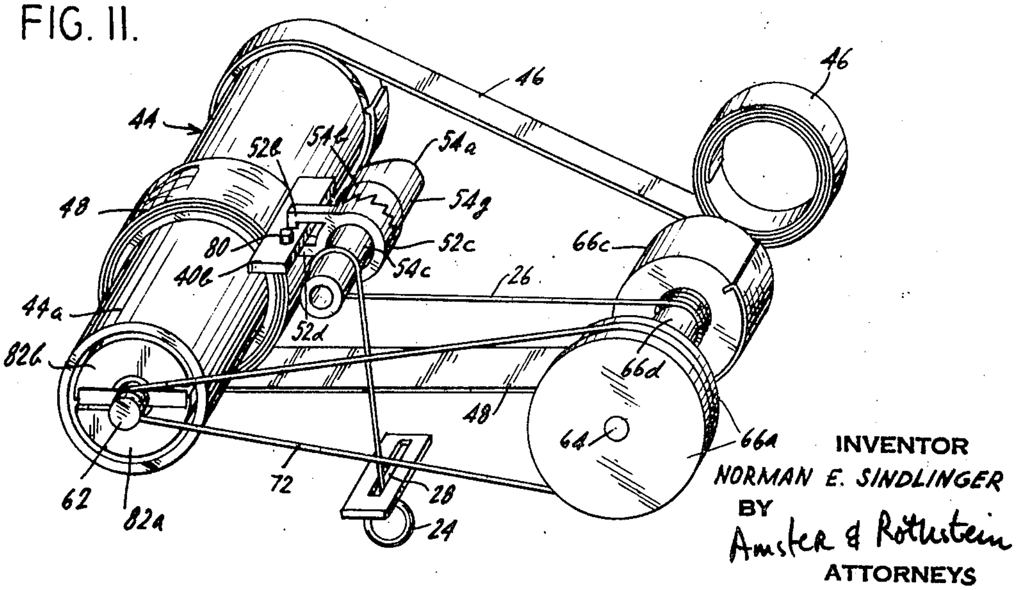
FIG. 11 is a symbolic perspective view illustrating parts of the overall assembly.

Referring to FIG. 11, a number of the elements in the illustrative embodiment of my invention are shown symbolically. Except for elements **40*b*, 52, 54, 80 and 28, and the wrapping of string 26 around surface 54*c*, the functional operation of the unit is similar to that disclosed in my above-identified co-pending application. Cylinder 44 serves as both the output drum for spring 46 and the take-up drum for tape 48. Spring 46 is attached at one end to drum 44 and is loosely coiled at the other end around a freely rotatable drum (not shown). In the rest position of the unit, the spring is coiled as shown. Tape 48 is attached at one end to drum 44 and at the other end to drum 66*c*. In the rest condition most of the tape is coiled around durm 44. String 26 is attached at one end to drum 66*d*, this drum being fixed to drum 66*c* and rotating with it. The other end of the string is extended through slit 28 (typically, a hole in the prior art) to a pull ring 24** at the outside of the doll body.

During wind-up, the string is drawn from the doll body and drum 66 rotates in the counter-clockwise direction. The tape is thus transferred from drum 44 to drum 66. Drum 44 similarly rotates in the counter-clockwise direction of drum 44, spring 46 is transferred to it. Upon release of the string, spring 46 returns to its natural coiled condition. In thus returning, it rotates drum 44 in the clockwise direction and causes tape 48 to be transferred from drum **66*c* to drum 44. The stylus (not shown) tracks one of the multiple grooves in tape 48 and the message is heard from the speaker coupled to the stylus. At the same time that the message is played, string 26 is drawn back into the doll and wound up on drum 66*d*. When pull ring 24 hits the doll body, spring 46** ceases to recoil and all movement stops.

Flanges **66*a* define a pulley around which belt 72 is wrapped, the belt also being wrapped around pulley 62. This latter pulley is attached to governor shoes 82*a*, 82*b*. During the play of the device, the pulley defined by flanges 66*a* rotates in the clockwise direction and causes pulley 62 to rotate in the same direction. Governor shoes 82*a*, 82*b* bear against the inside surface of drum 44. Pulley 62, however, rotates at a much faster speed than drum 44, and consequently there is relative movement between governor shoes 82*a*, 82*b* and the inside surface of drum 44. The governor shoes regulate the speed of tape 48**.

In another of my co-pending applications, Ser. No. 709,359, filed Feb. 29, 1968, a miniature tape audio device is disclosed which utilizes tape build-up effects to reduce the overall dimensions of the unit. In such a case the messages recorded on the tape are recorded at an effectively variable speed and the governor serves to maintain the angular velocity of the tape take-up drum at a constant value. Although such an arrangement may be incorporated in the illustrative embodiment of the present invention, the present invention is equally applicable to other arrangements which do not incorporate the features of my earlier application.

The message selection mechanism is shown only in skeletal form in FIG. 11. The tone arm assembly (not shown) is mounted on a shaft (not shown) which is transverse to tape 48. The supporting shaft is aligned with elements 52, 54, which elements are actually mounted on the shaft. The tone arm assembly is mounted on the shaft at the far end of the assembly shown in FIG. 11, that is, adjacent cam surface 54*a*. The tone arm assembly includes a similar cam surface, and as cam surface 54*a* rotates in the clockwise direction the tone arm assembly moves back and forth along its supporting shaft. Cam surface 54*a*, the far end of cam 54*g*, is part of an overall assembly including ratchet part 54*b* and shaft 54*c*. As string 26 is withdrawn from the doll, it applies a torque to shaft 54*c* which rotates the entire assembly in the clockwise direction. Shaft 54*c* passes through ratchet element 52*c* which has two depending legs 52*b*, 52*d*. These legs prevent rotation of ratchet element 52*c*, shaft 54*c* being mounted for rotatable movement inside the ratchet element. The ratchet elements are arranged such that element 54 can rotate in the clockwise direction with respect to ratchet element 52*c*.

At the end of the wind-up, cam surface 54*a* is in some position dependent upon the extent of the withdrawal of string 26 from the doll and the total rotation of shaft 54*c*, which rotation varies in accordance with the manner in which the child has withdrawn string 26 from the doll. Depending on the position of cam surface 54*a*, the transverse position of the tone arm assembly relative to the tape is determined. The stylus is thus positioned adjacent a particular groove. As the string is withdrawn into the doll as tape 48 moves past the stylus, the string applies a counter-clockwise torque to element 54. However, element 54 does not rotate at this time for two reasons. First, the torque applied is considerably less than that during wind-up because the pull ring end of string 26 has no force (once released) applied to it and the string simply slips around shaft 54*c* without applying an appreciable torque to it. Second, the ratchet assembly is such that ratchet element 54*b* cannot rotate in the counter-clockwise direction with respect to ratchet element 52*c*. Consequently, during play of the device, cam surface 54*a* does not rotate and the previously determined transverse position of the tone arm assembly does not change.

Cam surface 54*a* and the adjacent cam surface (not shown) on the tone arm assembly are such that the maximum range of transverse movement of the tone arm assembly is approximately equal to one-half the width of tape 48. During the wind-up, there are three possible positions for element 52. In the position shown, with legs 52*b*, 52*d* to the far side of lug 80, ratchet element 52*c* is positioned such that the tone arm assembly moves back and forth across the far half of tape 48. With element 52 positioned with its legs 52*b*, 52*d* on the near side of lug 80, the tone arm assembly moves back and forth across the near half of tape 48. With the depending legs in the same vertical plane as lug 80, that is, with leg 52*b* resting on top of the lug, the tone arm assembly moves back and forth across the central region of the tape with the message selection being limited to the inner half of the messages in the far group and the inner half of the messages in the near group.

Two legs 52*b*, 52*d* are required to prevent rotation of element 52 in opposite directions during both wind-up and play of the unit. Although shaft 54*c* is rotatable within element 52, there is friction between the two. This results in a small clockwise torque being applied to element 52 during wind-up and the raising of leg 52*b* slightly. This permits element 52 to be moved along shaft 54*c* without lug 80 blocking the movement by engagement with leg 52*b*.

If in pulling on ring 24 the child pulls in the direction of the far end of slit 28, string 26 bears against ratchet section 52*c*. This has the effect of forcing the ratchet to its extreme far position in addition to the natural tendency of the crossed string to act as a screw. If the string is pulled out of the doll in the direction of the near end of slit 28, the string bears against another section of element 52 (not shown) which forces the element to move to the near side of lug 80. On the other hand, if the string is pulled straight out of the doll body (substantially as shown in FIG. 11) there is little or no axial force applied to element 52 since axial force imparted by the screw action of the string is balanced by an opposing spring force (60, FIG. 3). In operation, however, it is exceedingly difficult for a child to pull the string straight out of the doll through the middle of slit 28. The string actually veers from side to side with the two legs 52*b*, 52*d* being centered but not fixed on lug 80. Although theoretically the range of movement is limited to only one-half the width of the tape, because element 52 is not prefectly fixed on lug 80 and actually moves back and forth on either side of it, the range of movement of the stylus is broadened correspondingly. With a widely changing direction of string 26 (but, on the average, straight out), it is possible for the child to randomly select any one of the messages on the complete tape.

Figure 1:
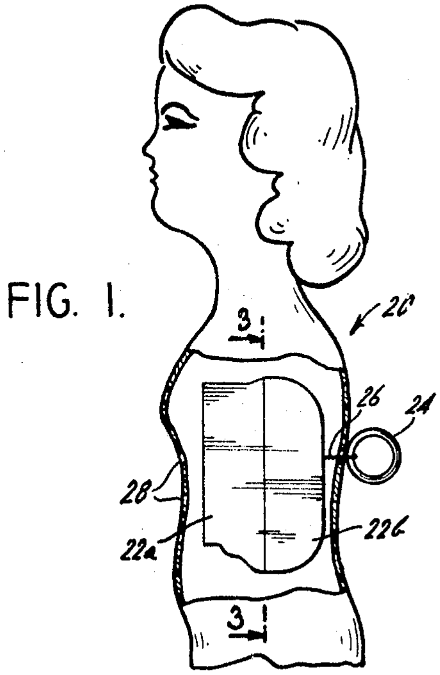
FIG. 1 is an elevational view, with parts broken away and in section, showing an audio device in accordance with the present invention mounted within a typical small doll, the audio device including two sections **22*a*, 22*b***.

The audio device itself comprises two sections 22*a*, 22*b* and is shown mounted in a typical doll 20 in FIG. 1. It may be mounted in any convenient fashion, as for example by having the audio device completely self-contained on its own support, as illustrated, or by actually employing the doll body as the only support for the audio device. At the front of the doll there are shown holes 28 through which the sound emitted by the audio device is transmitted. The speaker assembly is mounted in section 22*a* adjacent the front of the doll. As shown in FIG. 1, string 26 is extended out through the doll where it is attached to pull ring 24.

Figure 2:
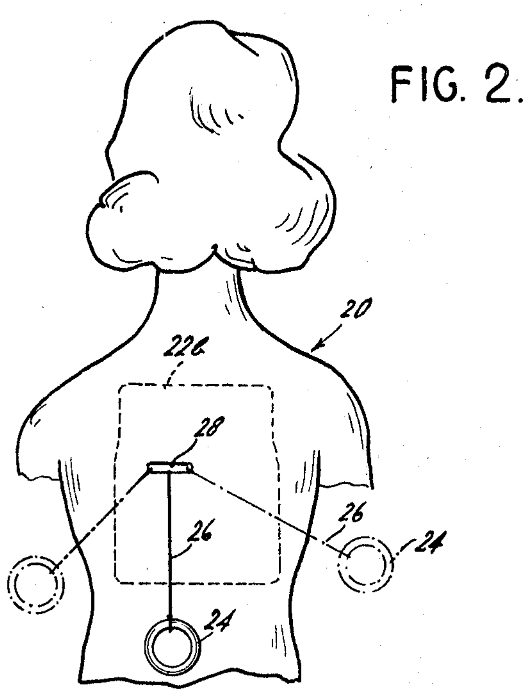
FIG. 2 is a back view of the doll of FIG. 1 showing the three ways in which the pull string can be withdrawn from the doll.

Referring to FIG. 2, string 26 is shown being withdrawn from the doll through the middle of slit 28. As described above, in such a case a message in either of the two groups may be selected. The two extreme positions of string 26 as it is being withdrawn from the doll are shown by the dotted lines in FIG. 2.

Figure 3:
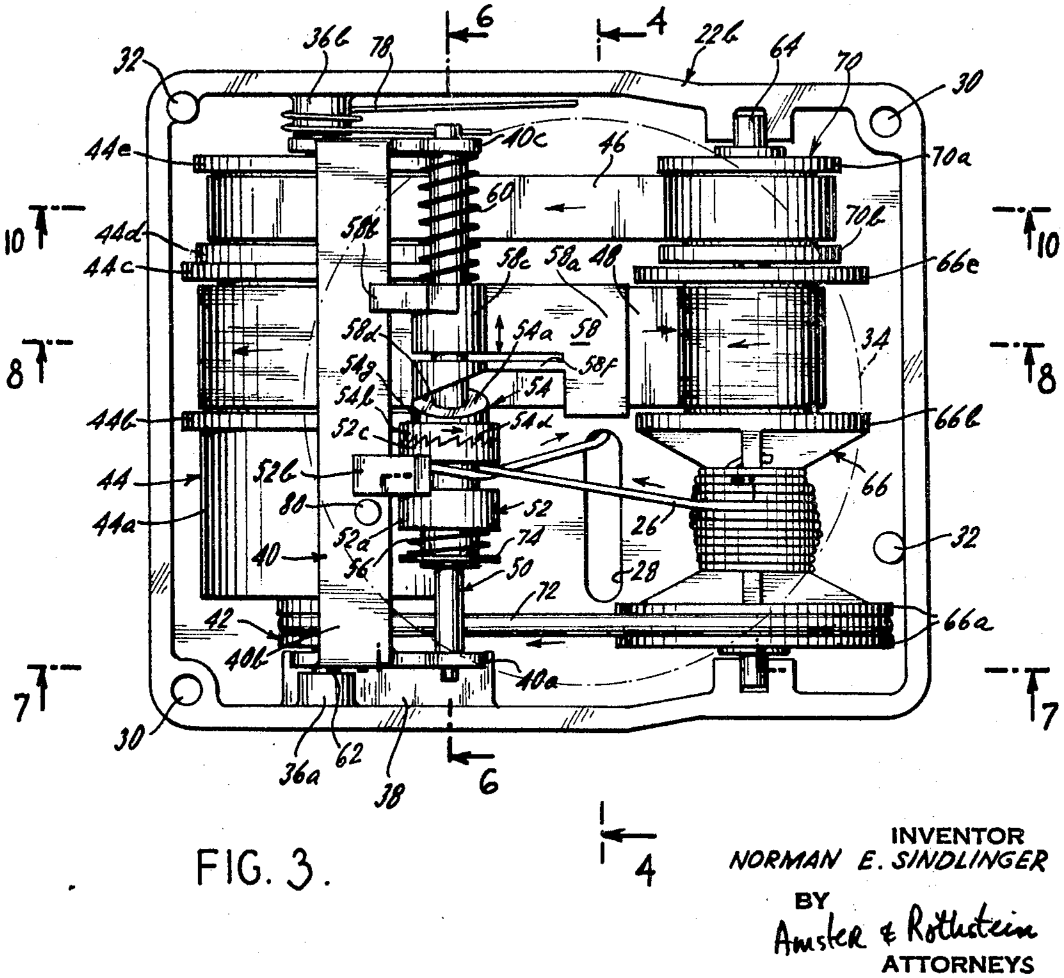
FIG. 3 is a front elevational view of section **22*b* taken along the lines 3—3** of FIG. 1, showing the unit as it is being wound up with the rotatable cam at one extreme of its range of movement along its supporting shaft.

FIG. 3 is a front elevational view of section 22*b*. This section includes two lugs 32 and two holes 30. Section 22*a* includes oppositely disposed holes and lugs for engaging section 22*b*. Section 22*a* includes speaker assembly 34, as shown for example in FIG. 4. The outline of the speaker assembly is also shown in FIG. 3 for orientation purposes. The tip of speaker 34, a conventional paper or plastic cone, engages surface 58*a* of the tone arm assembly during the play of the unit as seen most clearl yin FIG. 9. As stylus 76 tracks a groove on tape 48, the vibrations are extended through the tone arm assembly to the speaker cone and the message is heard.

Frame section 22*b* includes two supporting shafts 62, 64. Shaft 62 is mounted in two bearing sections 36*a*, 36*b*. Shaft 64 is mounted in two slots in section 22*b*, the two ends of shaft 64 being held in place by section 22*a* when it is attached to section 22*b*.

Shaft 64 has on it two independent elements 66, 70. Both are freely rotatable on the shaft. Element 66 includes pulley flanges 66*a*, string drum 66*d*, and flanges 66*b*, 66*e* on opposite sides of tape supply drum 66*c*. As shown in FIG. 3, when the string is withdrawn from the doll, element 66 rotates in the counter-clockwise direction. Belt 72 moves in the direction shown, string 26 is unwound from drum 66*d*, and tape 48 is wound up on drum 66*c*.

The other element 70 on shaft 64 consists of two flanges 70*a*, 70*b* on opposite sides of spring storage drum 70*c*. The spring has a natural tendency to coil around this drum, but as will be described below uncoils when string 26 is withdrawn from the doll. Although the spring is not attached to drum 70*c*, when the spring is coiled up it is wound tightly enough on the drum to cause the drum to rotate with it. Consequently, during the wind-up of the device element 70 rotates in the clockwise direction. The fact that elements 66 and 70 rotate in opposite directions is of no importance since both are mounted for free rotation on shaft 64.

Similarly, two separate rotating elements are mounted on shaft 62. The first is pulley 42 to which are attached governor shoes 82a, 82b. As described with reference to FIG. 11, the pulley is turned by belt 72 and governor shoes 82a, 82b bear against the inside surface of section 44a of element 44.

Figures 7, 8:
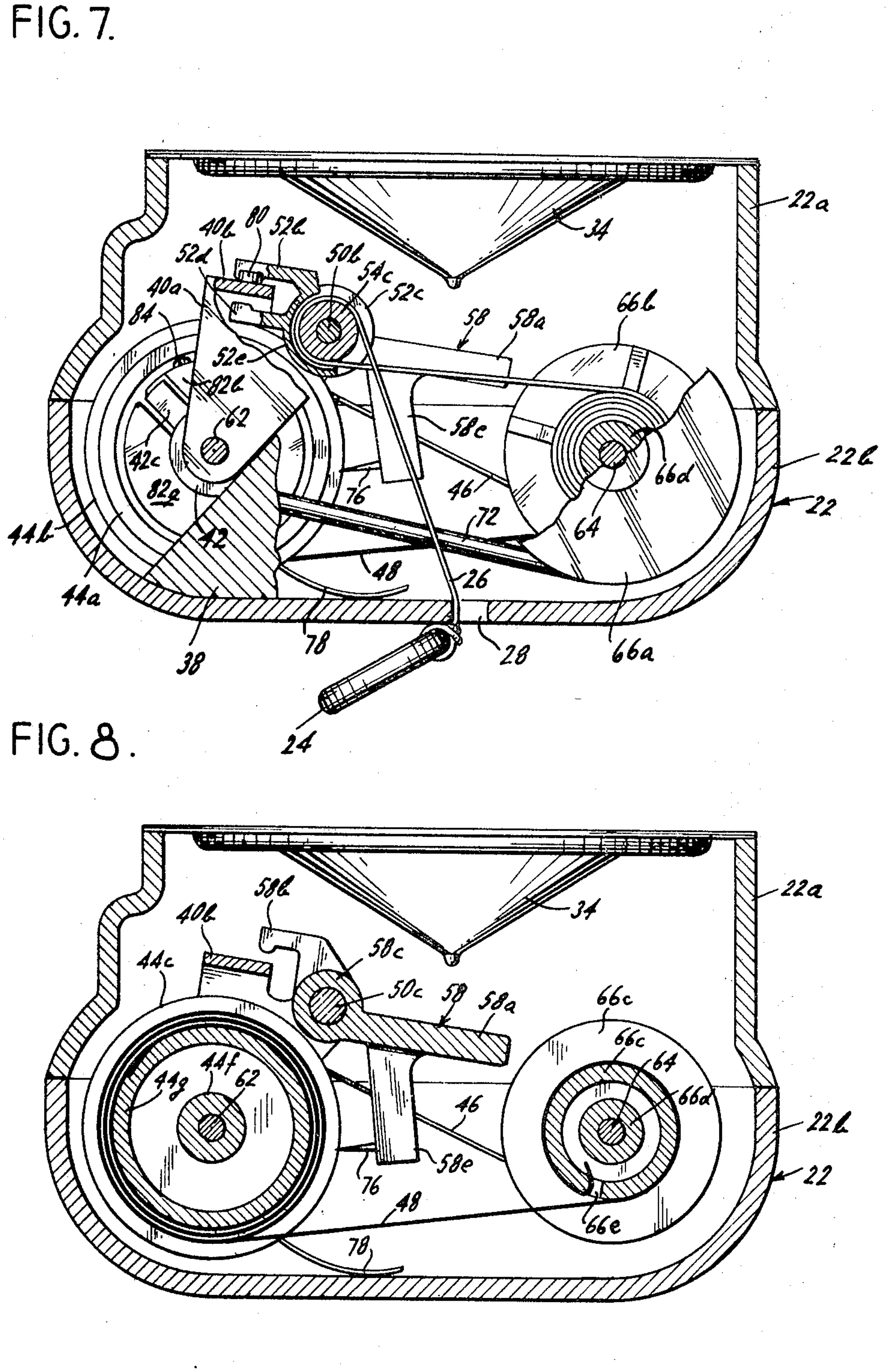
FIG. 7 is a sectional view, partly broken away, taken through line 7—7 of FIG. 3 showing the device in its rest condition.
FIG. 8 is a sectional view taken through the line 8—8 of FIG. 3 also showing the device in its rest condition.

Element 44 includes a hollow drum 44a (enclosing the governor shoes), two flanges 44b, 44c on either side of tape take-up drum 44g, and two flanges 44b, 44e on either side of spring output drum 44h. It is understood that element 44 need not be solid, and need not make contact with shaft 62 along its entire length. Instead a cylindrical section 44f surrounds shaft 62 along a portion thereof, as shown in FIG. 8, section 44f being connected to the remainder of element 44 by a bridging section at its interior. Tape 48 is secured at its left end to drum 44g. Spring 46 is secured at its left end to drum 44h.

When string 26 is withdrawn from the doll, as described above, tape 48 moves from left to right in FIG. 3 to be wound up on drum 66c and element 44 rotates in the counterclockwise direction. In so rotating, spring 46 is wound around drum 44h and moves in the direction shown in FIG. 3. At the end of the wind-up when the string is released, the spring returns to its natural coiled condition and tape 48 moves in the direction opposite to that shown in FIG. 3 parts stylus 76.

Figure 9:
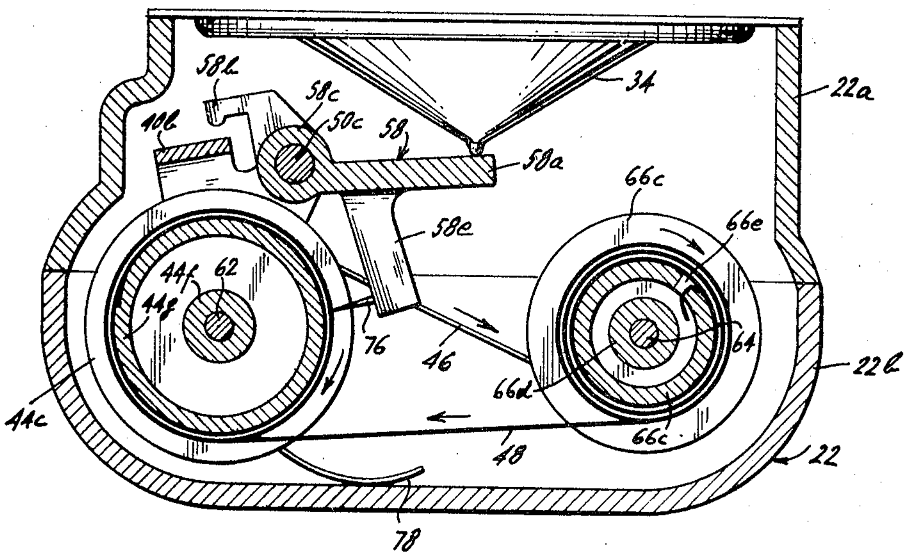
FIG. 9 is a view similar to that of FIG. 8 but showing the unit in its playing condition.

Element 40 is mounted on shaft 62 at its two opposite ends. This element consists of a flat plate 40b having two depending side sections 40a, 40c. The lower tip of each side section is mounted on shaft 62, and the entire assembly is pivotable on the shaft. The maximum clockwise movement (FIG. 7) is limited by stop 38 which is attached to frame section 22b and which engages side section 40a when element 40 is moved to its maximum position in the clockwise direction. The maximum movement in the counter-clockwise direction is determined by tone arm assembly 58, as shown in FIG. 9 and as will be described below.

At the forward tips of side sections 40a, 40c, two holes are provided for carrying shaft 50. This shaft is shown most clearly in FIG. 6. Section 50a of the shaft fits in a hole in section 40a. Section 50b and larger diameter section 50c together support element 54. Larger diameter section 50c also supports tone arm assembly 58 and section 50d of the shaft fits in a hole in side section 40c. Spring 78 is provided to bias shaft 50 and element 40 in an upward direction as seen most clearly in FIGS. 3–5. The spring is coiled around support bearing 36b, one end of it engaging the bottom of frame section 22b and the other end engaging shaft 50 to force it up toward speaker 34 in frame section 22a. When string 26 is withdrawn from the doll, shaft 50 is pulled down away from speaker 34. When the string is released spring 78 forces shaft 50 and supporting member 40 to move up toward speaker 34.

Figures 5, 6:
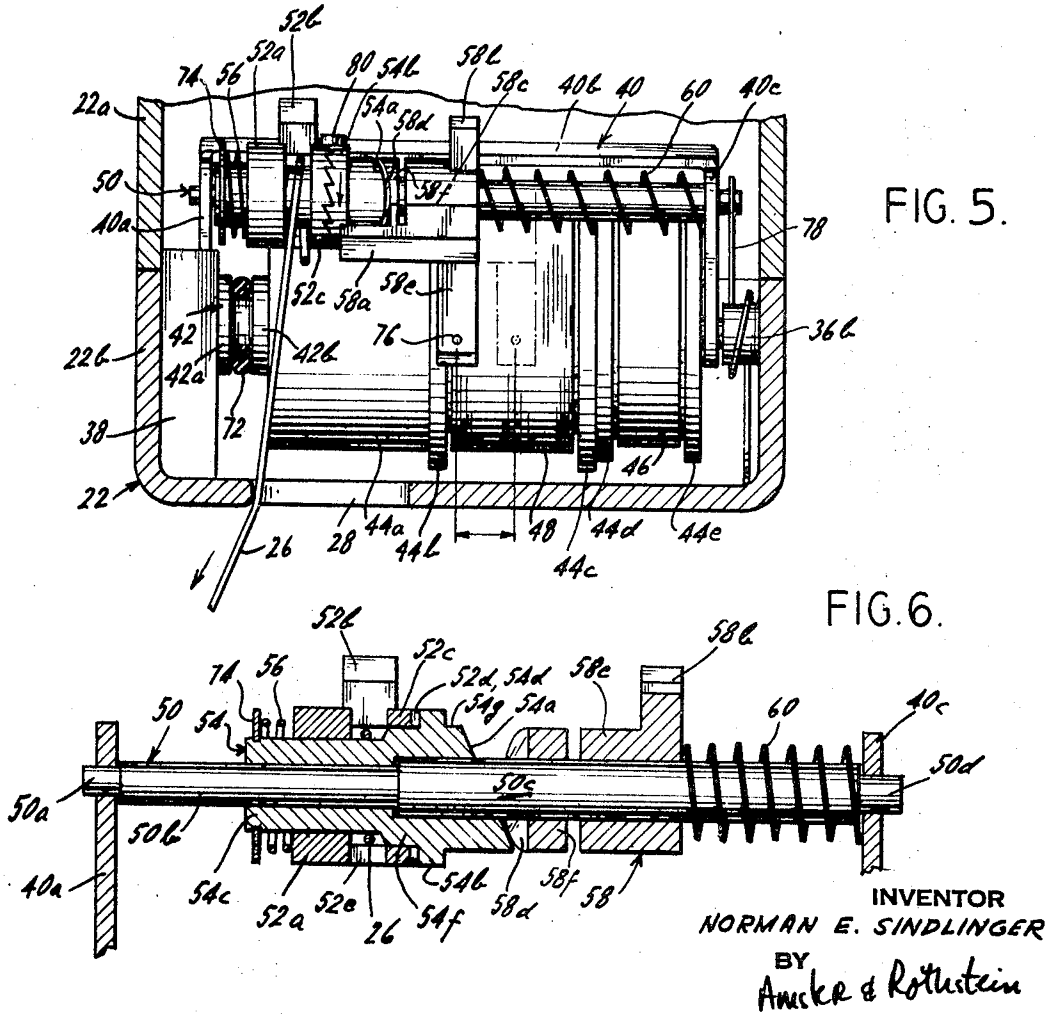
FIG. 5 is a sectional view similar to that of FIG. 4 but showing the rotatable cam in its second extreme position.
FIG. 6 is an enlarged sectional view taken through the line 6—6 of FIG. 3.

Shaft 50 carries not only tone arm assembly 58 but also the mechanism for controlling the partially-programmed, partially-random selection of one of the messages on the tape. As shown in FIG. 6, the shaft carries only two elements—tone arm assembly 58 and element 54. Element 52 is carried by sections 54c, 54f of element 54, rather than being carried directly on shaft 50 itself.

Element 54 includes a cam 54g having a cam surface 54a. The element also includes ratchet section 54b which has ratchet teeth 54d around its edge as shown most clearly in FIG. 3.

Element 52 includes two bearing members 52a, 52c, member 52c including a plurality of ratchet teeth 52d around its edge for engaging ratchet member 54b. The two sections 52a, 52c are fixed relative to each other by bridging section 52e shown most clearly in FIG. 7. This section is radially coextensive with ratchet member 52c. The inner diameter of semi-circular section 52e is larger than the outer diameter of section 54c of element 54, as shown most clearly in FIGS. 4–6.

The operation of the assembly can be best understood with reference to FIG. 6. String 26 is passed over section 54c between sections 52a, 52c. The string is passed over cylindrical section 54c and then as it continues around the section it passes through the opening defined by cylindrical section 54c and bridging section 52e.

At the end of cylindrical section 54c there is mounted a retaining washer 74, spring 56 being included between the washer and the leftmost end of element 52. Spring 56 forces element 52 to the right such that the two sets of ratchet teeth 52d, 54d engage each other as shown in FIGS. 3–6. Actually, since element 52, as will be described below, is maintained at a position dependent upon the manner in which string 26 is withdrawn from the doll, it is more accurate to describe the function of spring 56 as forcing element 54 to the left so that ratchet member 54b engages ratchet member 52c.

When string 26 is withdrawn from the doll, element 54 rotates in the clockwise direction as shown on FIG. 3. Positioning member 52, however, does not rotate because legs 52b, 52d are disposed on opposite sides of plate 40b and prevent rotation of element 52. Member 54 simply rotates, with sections 54c, 54f bearing against respective sections 52a, 52c of the positioning element 52. Due to the configuration of the ratchet teeth, element 54 is permitted to rotate in the clockwise direction despite the fact that element 52 does not rotate.

Tone arm assembly 58 includes a pivoting member 58c carried by shaft 50, a planar section 58a for making contact with speaker cone 34, and a depending leg 58e in which stylus 76 is mounted. The unit also includes a leg 58b which prevents excessive turning of the tone arm assembly in the counter-clockwise direction, as will be described below. Referring to FIG. 6, supporting member 58c terminates in cam surface 58d, this cam surface being adjacent cam surface 54a of element 54. Spring 60 is a light spring which biases the tone arm assembly to the left of FIG. 6 toward element 54. The spring is very weak and is unable to significantly bias element 54 and element 52 to the left of shaft 50. Spring 60 simply serves to maintain continuous contact between tone arm assembly 58 and cam surface 54a.

Figure 4:
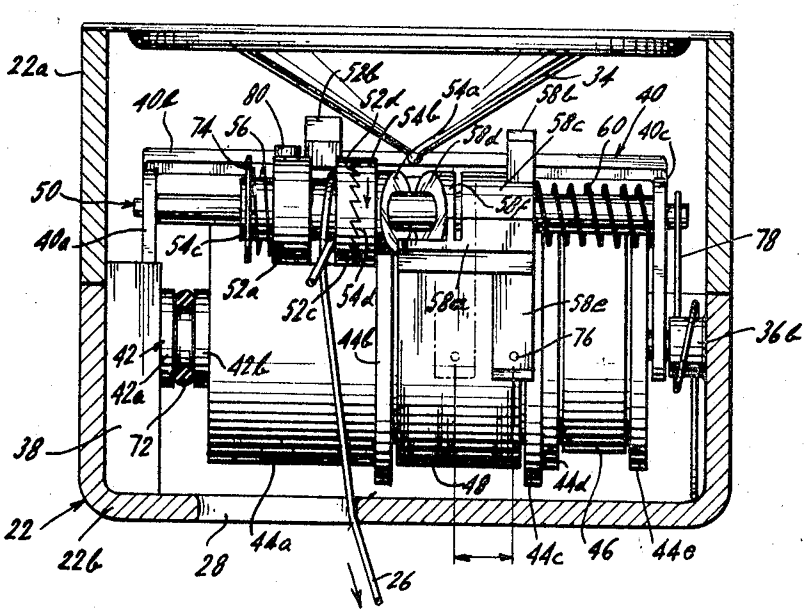
FIG. 4 is a sectional view taken through the line 4—4 of FIG. 3, and additionally showing a cross-section of section **22*a*** of the overall unit.

Cam surface 58d does not significantly rotate on shaft 50. Cam surface 54a does rotate on the shaft when string 26 is withdrawn. For any given axial position of element 54, the tone arm assembly is at its maximum position to the left, as shown in FIG. 5, when element 54 has rotated such that the two cam surfaces are flush with each other all along their outer peripheries. Maximum movement of the tone arm assembly in the opposite direction is achieved when the two cam surfaces abut each other at their extremities as shown in FIG. 4. With positioning element 52 held fixed, the range of movement of the tone arm assembly as element 54 rotates is equal to approximately half the width of the tape.

If the child pulls the string out of the doll with the string veering toward one side as shown in FIGS. 3 and 4, the string bearing against section 52c of positioning element 52 forces the element to move toward side plate 40c and away from side plate 40a. As shown in FIG. 6 the movement is limited by section 54c abutting against large diameter section 50c of shaft 50. In this extreme position legs 52b, 52d are on the right side of lug 80. As shown in FIG. 4, when the two cam surfaces have relative positions such that the tone arm assembly is displaced away from elements 52 and 54 to the maximum extent, stylus 76 is adjacent the right edge of tape 48. As cam surface 54a rotates, the tone arm assembly is forced to the left by spring 60, and when the two cam surfaces are relatively flush with each other the stylus is positioned adjacent the middle groove on the tape as shown by the dotted lines of FIG. 4. The tone arm assembly and stylus move back and forth between the two extreme positions.

Figure 12:
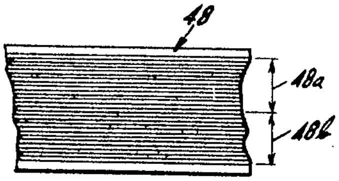
FIG. 12 depicts a section of the multi-groove tape 48 incorporated in the audio device.

A section of tape 48 is shown in FIG. 12. Grooves **48*a* on one half of the tape represent "happy" messages. Grooves 48*b* on the other half of the tape represent "sad" messages. With the range of movement of the stylus restricted to only one-half of the tape, although a message is selected at random, the message is necessarily one in the predetermined group. The particular message which is selected depends upon the final angular position of element 54. This in turn depends on the position of the element at the end of the preceding play, the extent to which the string is withdrawn from the doll, and the manner in which it is withdrawn, the latter affecting the friction between the string and cylindrical section 54*c* and necessarily the amount that element 54** is rotated.

FIG. 5 shows the tone arm assembly in its maximum leftmost position. In this case the string is withdrawn from the other side of slit 28 and positioning element 52 is in its extreme position on the left. In this case, the movement of the positioning element is limited by the leftmost end of section **54*c* of element 54 abutting against side plate 40*a*. As shown in FIG. 5, the two cam surfaces are flush with each other and stylus 76 is in its maximum leftmost position. As element 54** rotates, when the two cam surfaces are in their maximum separated positions as shown in FIG. 4 the stylus is adjacent the middle groove of the tape, as shown by the dotted lines in FIG. 5. Thus, with the string pulled out toward the other side of the doll, the range of movement of the tone arm assembly and stylus is limited to the other half of the tape.

As described above, when the string is first pulled and element 54 starts rotating in the clockwise direction as shown in FIG. 3, a small torque is applied to positioning element 52 in the same direction, this torque arising not only from the friction between elements 52 and 54, but by the ratchet engagement as well. Although the configuration of the ratchet assembly is such that element 54 can rotate while element 52 remains stationary, a slight torque is nevertheless applied to the positioning element. The positioning element turns slightly but is immediately limited by leg **52*d* striking the undersurface of plate 40*b*. The slight rotation of positioning element 52, however, is sufficient to raise leg 52*b* to a level above lug 80. The raising of this leg permits movement of positioning element 52** in either direction in accordance with the direction of the pull.

As soon as the string is released, spring 46 starts to rewind and in addition to tape 48 passing the stylus, the string is withdrawn into the unit. Because there is little tension in the string after it is no longer held by the child, only a small torque is applied to element 54 as the string is drawn back into the doll. The torque may be sufficient, however, to turn element 54 in the counter-clockwise direction as shown on FIG. 3. As soon as the element 54 starts turning, however, because the ratchet teeth on elements 52 and 54 are engaged and there is no slip between them in the reverse direction, positioning element 52 starts to rotate in the counter-clockwise direction. Leg **52*b* rotates slightly in the counter-clockwise direction until it engages plate 40*b*. At this time the leg is locked on one side of lug 80 (if the positioning element was priorly placed in either extreme position), and further axial movement of positioning element 52 is prevented. The positioning element must not move during the play so that once a message is selected the stylus will remain in the same transverse position throughout the duration of the play of that message. If leg 52*b* is positioned directly above lug 80, positioning element 52 does not significantly move in the axial direction, since the axial force of spring 60** is so low that it cannot appreciably accelerate the tone arm assembly before stylus-groove engagement occurs.

FIG. 7 shows the unit in its rest position following a play of a message on the side of tape 48 closest to spring 46, that is, with leg **52*b* being displaced to the far side of lug 80. This figure also illustrates governor shoes 82*a*, 82*b* disposed inside drum 44*a*, each governor shoe being provided with a pad 84 for engaging the inside surface of the drum as pulley 42 picks up speed. FIG. 7 will be helpful in understanding the position of tone arm assembly 58** both in the rest condition and during wind-up. FIG. 8 which is also a sectional view taken through the unit in its rest condition is also helpful in this regard.

As the string is being withdrawn from the doll, a force is applied to shaft 50 which rotates the shaft and frame 40 in the clockwise direction. Movement is limited by the engagement of side section **40*a* with stop 38 attached to frame section 22*b*. In this position, the tone arm assembly is not forced up into engagement with speaker 34. Effectively, the tone arm assembly is freely rotatable on shaft 50. The position assumed by the tone arm assembly is to a great extent determined by the position of the doll as the talking mechanism is being wound up. It is of course possible that stylus 76 will still engage the outer turn of tape 48 on drum 44*g* as the tape is transferred from this drum to drum 66*c*. Although the stylus moves across the width of the tape, the tape is not scratched by the stylus because the stylus is not significantly forced againt the tape. The tone arm assembly simply swings on shaft 50 such that the stylus is free to lift from the outer turn of the tape on drum 44*g*. Cam friction will tend to rotate the tone arm in an oscillating fashion about shaft 50**, but with relatively low force.

It is possible that the child might hold the doll in a position such that the speaker cone is facing downward. In such a case the tone arm assembly would rotate around shaft 50 by the force of its own weight until planar section **58*a* would engage the tip of the speaker cone. This is undesirable because the tone arm assembly, during the wind-up, is moving back and forth across the width of the tape and the movement of planar section 58*a* across the tip of the speaker in addition to the oscillating motion would result in an annoying noise. For this reason, leg 58*b* is provided on the tone arm assembly. When the tone arm assembly starts to rotate in the counter-clockwise direction in FIG. 8 such that section 58*a* is directed toward the speaker, leg 58*b* strikes plate 40*b*** and limits the tone arm assembly movement short of contacting the speaker.

FIG. 9 is a view substantially the same as FIG. 8 but shows the position of frame 40 and tone arm assembly 58 during the play, after the string has been released by the child. In this case, spring 78 (FIGS. 3–5) forces shaft 50 and frame 40 to rotate in the counter-clockwise direction. The frame continues to rotate until the tone arm assembly and stylus are wedged between the tip of the speaker cone and the outer turn of tape 48 on drum **44*g*, as shown in FIG. 9. It is spring 78 which determines the tracking force of stylus 76 since it is the spring which rotates frame 40 such that the tone arm assembly is wedged in its playing position. As the stylus moves up and down relative to the selected tape groove, the vibrations extended to speaker cone 34 result in the audible reproduction of the selected message. This occurs since the mass of frame 40, shaft 50**, etc. are much greater than the tone arm assembly, and within the audible range only the tone arm can respond.

It should be noted that a cut-out is provided in the tone arm assembly so that planar section **58*a* does not extend clear across the assembly; instead, section 58*f* is formed. In the event the selected groove is skewed slightly toward elements 52 and 54, the stylus will be moved slightly toward these elements as the play progresses. The cut-out forming sections 58*a* and 58*f*** allows this slight change in stylus position. Without it, the stylus might be forced to jump to the adjacent groove toward the end of the message being played.

Figure 10:
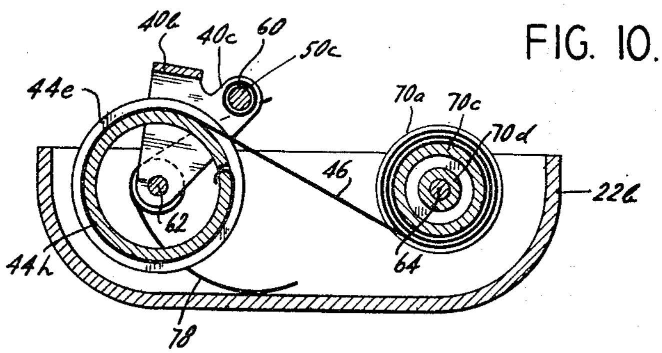
FIG. 10 is a reduced sectional view taken through line 10—10 of FIG. 3.

FIG. 10 is a sectional view taken along the line 10—10 of FIG. 3 and, in addition to showing the left end of spring 46 being attached to drum **44*h*, shows the construction of spring storage drum 70. This drum consists of two external flanges 70*a*, 70*b* with an intermediate drum surface 70c. A central cylindrical section 70d is mounted on shaft 64, section 70**d being connected to the outer section of the unit by a connecting bridge, as is known in the art.

Although the invention has been described with reference to a particular embodiment, it is to be understood that this embodiment is merely illustrative of the application of the principles of the invention. For example, instead of providing only two groups of messages on the tape, it is possible to provide three or more. Depending on the direction of string 26 as it is withdrawn from the doll body, positioning element 52 may assume any one of a number of distinct positions in which case a message would be selected at random but only from among those of a predetermined group. Thus, it is to be understood that numerous modifications may be made in the illustrative embodiment of the invention and other arrangements may be devised without departing from the spirit and scope of the invention.

What is claimed is:

1. A tape audio device comprising a tape having a plurality of messages recorded thereon in side-by-side grooves, tape supply and take-up drums, the two opposite ends of said tape being connected respectively to said take-up and supply drums, a spring coupled to said take-up drum, a pull string, means responsive to the pulling of said pull string out of the audio device for winding up said spring and for transferring said tape from said take-up drum to said supply drum, the release of said string thereafter allowing said spring to rewind, said pull string to be drawn back into the audio device and said tape to be transferred from said supply drum back to said take-up drum, a stylus for engaging a groove on said tape while said tape is being transferred back to said take-up drum, means responsive to the tracking of a selected groove by said stylus for reproducing the message recorded in said selected groove, means responsive to pulling on said pull string for controlling movement of said stylus back and forth across said tape, and means responsive to the directions in which said pull string is pulled for controlling the range of movement of said stylus across said tape to predetermined respective groups of grooves on said tape.

2. A tape audio device in accordance with claim 1 wherein said stylus movement controlling means includes a shaft mounted in said audio device in a direction transverse to the direction of movement of said tape, means mounted on said shaft for rotatable movement and having a first cam surface, stylus holding means mounted on said shaft for axial movement therealong and having a second cam surface, means for biasing said stylus holding means toward said rotatable means for engaging said first and second cam surfaces, and means for controlling rotation in one direction of said rotatable means by said pull string as said pull string is pulled out of the audio device.

3. A tape audio device in accordance with claim 2 wherein said rotation controlling means is operative to prevent rotation of said rotatable means in the other direction during the play of one of said messages and the drawing of said pull string into the audio device.

4. A tape audio device in accordance with claim 3 wherein said means for controlling the range of movement of said stylus across said tape includes means responsive to tension components in said pull string along said shaft in either direction for moving along said shaft and for positioning said rotatable means in respective selected axial positions along said shaft.

5. A tape audio device in accordance with claim 4 wherein said rotation controlling means includes means for preventing rotation of said positioning means around said shaft, and engaging ratchet means on said positioning means and said rotatable means for permitting rotation of said rotatable means with respect to said positioning means in only said one direction.

6. A tape audio device in accordance with claim 4 further including means for limiting the axial movement of said positioning means within a predetermined range along said shaft.

7. A tape audio device in accordance with claim 4 further including means for biasing said shaft to a position such that said stylus makes engagement with said tape and said stylus holding means makes engagement with said reproducing means, said pull string being wrapped around said rotatable means such that when a tension force is applied to said pull string said shaft is moved in opposition to the force of said shaft biasing means such that said stylus holding means is moved away from said reproducing means.

8. A tape audio device in accordance with claim 7 further including means for preventing more than a predetermined rotation of said stylus holding means about said shaft to prevent engagement of said stylus holding means with said reproducing means when said shaft is moved in opposition to the force of said shaft biasing means.

9. A tape audio device in accordance with claim 1 wherein the grooves on one side of said tape include messages of a first type and the grooves on the other side of said tape include messages of a second type, and said means for controlling the range of movement of said stylus controls the selection of a groove from those on one side of said tape when said pull string is pulled in a first direction and controls the selection of a groove from those on the other side of said tape when said pull string is pulled in a second direction.

10. A tape audio device in accordance with claim 6 wherein the grooves on one side of said tape include messages of a first type and the grooves on the other side of said tape include messages of a second type, and the pulling on said pull string with tension components exceeding a predetermined value along said shaft in either direction is operative to move said positioning means to the extreme axial position within said predetermined range along said shaft in either direction for controlling the range of movement of said stylus adjacent to the grooves on the respective side of said tape.

11. A tape audio device comprising a tape having a plurality of messages recorded thereon in side-by-side grooves, tape supply and take-up drums, the two opposite ends of said tape being connected respectively to said take-up and supply drums, a spring coupled to said take-up drum, a pull string, means responsive to the pulling of said pull string out of the audio device for winding up said spring and for transferring said tape from said take-up drum to said supply drum, the release of said string thereafter allowing said spring to rewind, said pull string to be drawn back into the audio device and said tape to be transferred from said supply drum back to said take-up drum, a stylus for engaging a groove on said tape while said tape is being transferred back to said take-up drum, means responsive to the tracking of a selected groove by said stylus for reproducing the message recorded in said selected groove, and means responsive to pulling on said pull string for controlling movement of said stylus back and forth across said tape adjacent to a group of said grooves, less than said plurality, dependent upon the direction in which said pull string is pulled.

12. A tape audio device in accordance with claim 11 wherein said stylus movement controlling means includes a first mechanism for controlling movement of said stylus across said tape within a predetermined range responsive to pulling on said pull string, and a second mechanism for controlling the positioning of said predetermined range of movement dependent upon the direction in which said pull string is pulled.

13. A tape audio device in accordance with claim 12 further including an exit slit in said audio device through which said pull string exits the audio device, said slit having a length sufficient such that pulling of said pull string out of the audio device at either end of said slit produces a tension component in said pull string in a direction transverse to the direction of movement of said tape sufficient to effect positioning of said range of movement at two extremes along the width of said tape.

14. A tape audio device comprising a tape having a plurality of messages recorded thereon in side-by-side grooves, tape supply and take-up drums, the two opposite ends of said tape being connected respectively to said take-up and supply drums, a spring coupled to said take-up drum, a pull string, means responsive to the pulling of said pull string out of the audio device for winding up said spring and for transferring said tape from said take-up drum to said supply drum, the release of said string thereafter allowing said spring to rewind, said pull string to be drawn back into the audio device and said tape to be transferred from said supply drum back to said take-up drum, a stylus for engaging a groove on said tape while said tape is being transferred back to said take-up drum, speaker means, a shaft mounted in said audio device in a direction transverse to the direction of movement of said tape, stylus holding means mounted on said shaft for engaging said speaker means and capable of axial movement along said shaft, said stylus holding means having a first cam surface, means mounted on said shaft for rotatable movement thereon and having a second cam surface, means for biasing said stylus holding means and said rotatable means toward each other on said shaft for engaging said first and second cam surfaces, and means for controlling rotation in one direction of said rotatable means by said pull string as said pull string is pulled out of the audio device to effect a back-and-forth movement of said stylus holding means along said shaft adjacent to said tape.

15. A tape audio device in accordance with claim 14 further including means for preventing rotation of said rotatable means in the other direction during the play of one of said messages and the drawing of said pull string into the audio device.

16. A tape audio device in accordance with claim 14 wherein said back-and-forth movement of said stylus holding means effected by the rotation of said rotatable means is limited to a range along said shaft less than the width of said tape containing grooves thereon, and further including means responsive to the direction in which said pull string is pulled for controlling the position of the middle of said back-and-forth range of movement along said shaft to control the selection of a groove from a selected group of grooves.

17. A tape audio device in accordance with claim 16 further including means for preventing rotation of said rotatable means in the other direction during the play of one of said messages and the drawing of said pull string into the audio device.

18. A tape audio device in accordance with claim 17 wherein said means for preventing rotation of said rotatable means in said other direction includes means for preventing rotation of said positioning means around said shaft, and engaging ratchet means on said positioning means and said rotatable means for permitting rotation of said rotatable means with respect to said positioning means only in said one direction.

19. A tape audio device in accordance with claim 14 further including means for biasing said shaft to a position such that said stylus makes engagement with said tape and said stylus holding means makes engagement with said speaker means, said pull string being wrapped around said rotatable means such that when a tension force is applied to said pull string said shaft is moved in opposition to the force of said shaft biasing means to effect a movement of said stylus holding means away from said reproducing means.

20. A tape audio device in accordance with claim 19 wherein said pull string is wrapped around said rotatable means for turning said rotatable means as said pull string is pulled out of the audio device, and said positioning means is movable in either direction along said shaft responsive to movement of said pull string along said rotatable means in either direction along said shaft.

21. A tape audio device in accordance with claim 19 further including means for preventing more than a predetermined rotation of said stylus holding means about said shaft to prevent engagement of said stylus holding means with said speaker means when said shaft is moved in opposition to the force of said shaft biasing means.

22. A tape audio device comprising a tape having recorded thereon at least two groups of messages, each group having a plurality of messages in side-by-side grooves, manually operable first means for moving said tape in a first direction, second means for moving said tape in a second direction, sound reproducing means for engaging one of said grooves on said tape while said tape is moved in said second direction for reproducing the message recorded therein, said first means being operable in at least two modes, means operated by said first means for moving said sound reproducing means back and forth across the width of said tape to select at random a groove for reproduction, and means responsive to the mode in which said first means is operated for limiting the selection of a groove from among those in only a predetermined one of said at least two groups.

23. A tape audio device in accordance with claim 22 wherein said first tape moving means is a string, said operable modes are directions of pull of said string and said groove selection means includes cam means adjacent to said sound-reproducing means adapted to be turned by pulling on said string for controlling back-and-forth movement of said sound-reproducing means and means for shifting the transverse position of said cam means relative to said tape in accordance with the direction in which said string is pulled for centering the range of movement of said sound-reproducing means adjacent to a selected group of grooves on said tape.

24. A tape audio device in accordance with claim 23 further including a shaft mounted in the audio device transverse to the directions of movement of said tape, said sound-reproducing means being mounted on said shaft for axial movement therealong, and wherein said cam means includes a cylindrical element mounted on said shaft for rotation thereon and having a cam surface at one end thereof for engaging said sound-reproducing means to control back-and-forth movement thereof along said shaft responsive to rotation of said cylindrical element around said shaft, said centering means includes means mounted for movement in the direction of said shaft for controlling corresponding axial movement of said cylindrical element along said shaft, and said string is wrapped around said cylindrical element and is engageable with said centering means such that pulling on said string causes said cylindrical element to rotate and the direction in which said string is pulled controls movement of said centering means along said shaft in a corresponding direction.

25. A tape audio device in accordance with claim 23 wherein the grooves on one side of said tape include messages of a first type and the grooves on the other side of said tape include messages of a second type, and said centering means controls the range of movement of said sound-reproducing means to effect the random selection of a groove from those on one side of said tape when said string is pulled in a first direction and controls the range of movement of said sound-reproducing means to effect the random selection of a groove from those on the other side of said tape when said string is pulled in a second direction.

26. A tape audio device in accordance with claim 25 wherein the pulling of said string in a direction between said first and second directions controls the range of movement of said sound-reproducing means to effect the random selection of a groove from those on either side of said tape.

27. An audio device comprising a record medium having recorded thereon at least two groups of messages, each group having a plurality of messages, manually operable means for controlling the reproduction of one of said messages, said controlling means being manually operable in at least two modes, first means operated by said controlling means responsive to the mode in which said controlling means is operated for selecting a predetermined one of said at least two groups of messages, and second means for randomly selecting for play a message in the selected group.

28. An audio device in accordance with claim 27 wherein said selection controlling means is a pull string and said limiting means is responsive to the direction in which said pull string is pulled.

References Cited

UNITED STATES PATENTS

| | | | |
|---|---|---|---|
| 3,410,564 | 11/1968 | Duncan | 274—1 |
| 3,389,915 | 6/1968 | Owen | 274—1 |
| 1,979,068 | 10/1934 | Grubman | 274—1 |

LEONARD FORMAN, Primary Examiner

DENNIS A. DEARING, Assistant Examiner

U.S. Cl. X.R.

274—1